June 5, 1923.
F. J. McGETTIGAN
PICTURE PROJECTOR ATTACHMENT
Filed March 25, 1921
1,457,782
3 Sheets-Sheet 1
Fig. 1
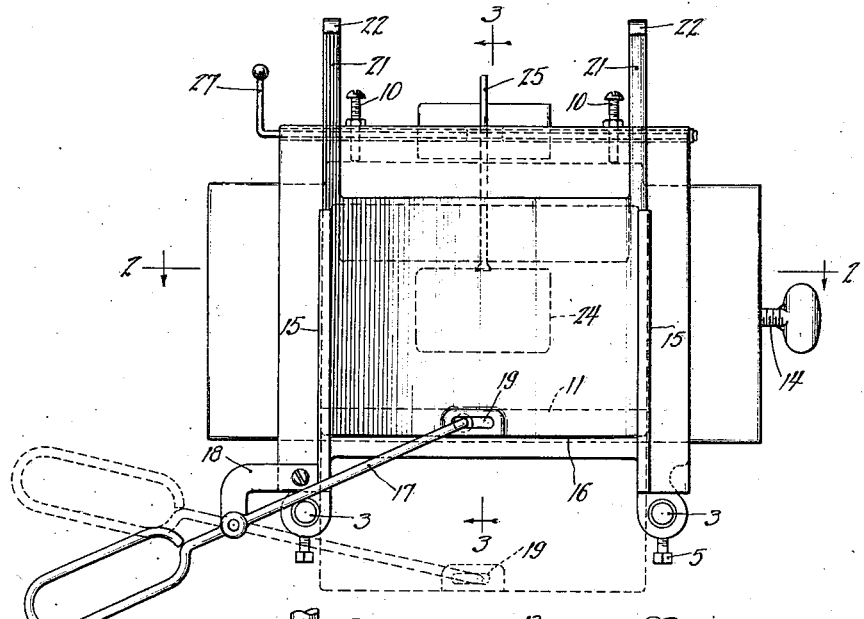
Fig. 2
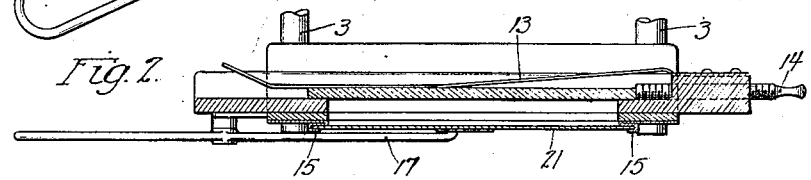
Fig. 5
Fig. 3
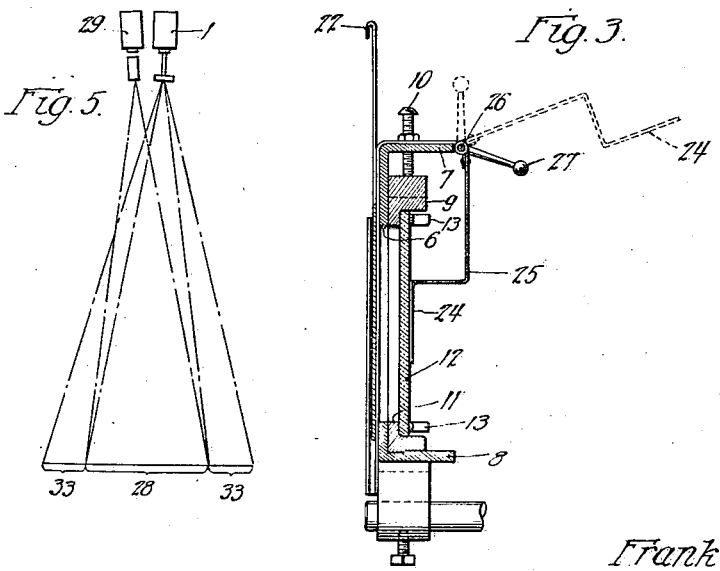
Inventor.
Frank J. McGettigan.
By Fisher, Fowle, Clapp & Soans.
Attys

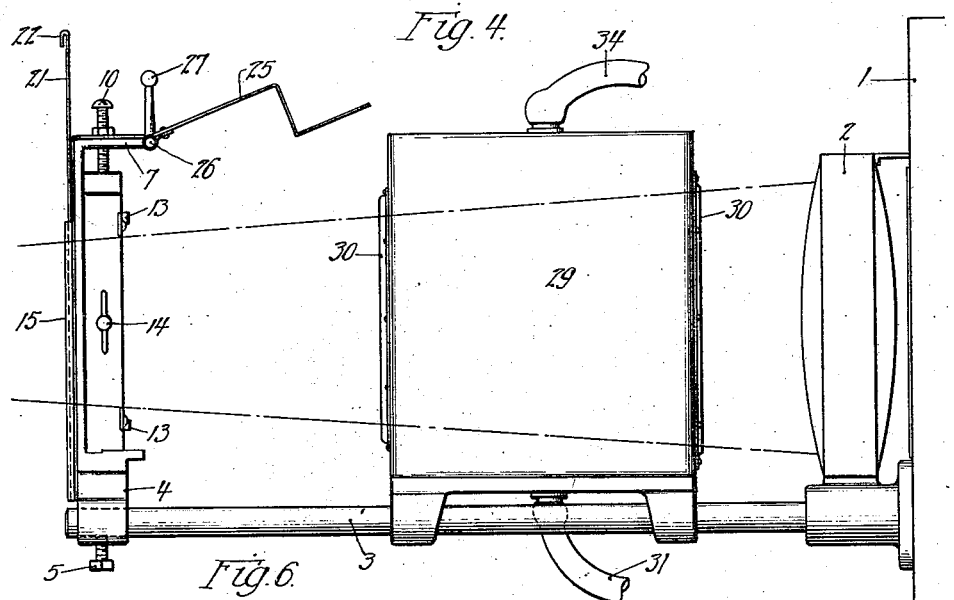

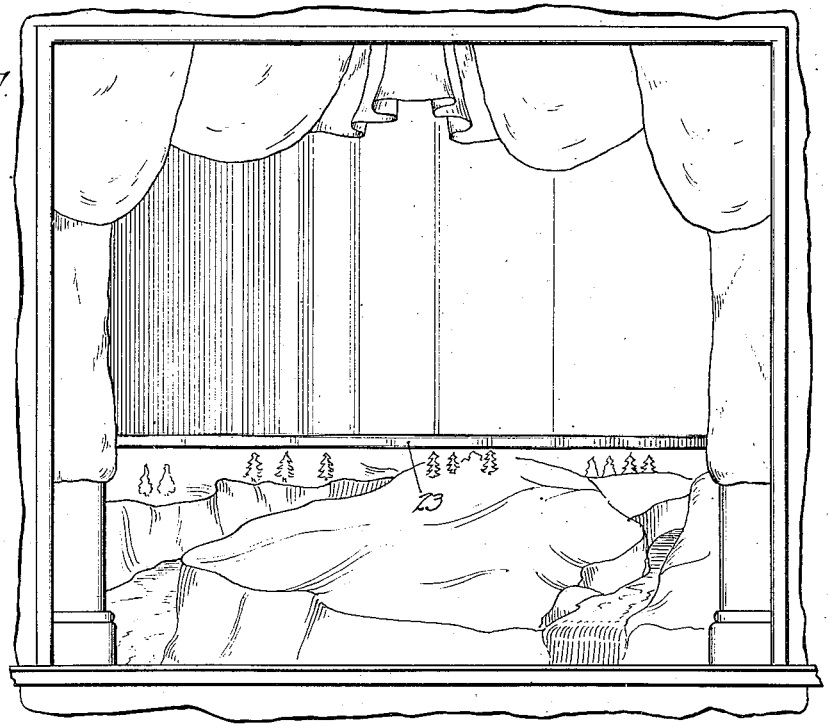
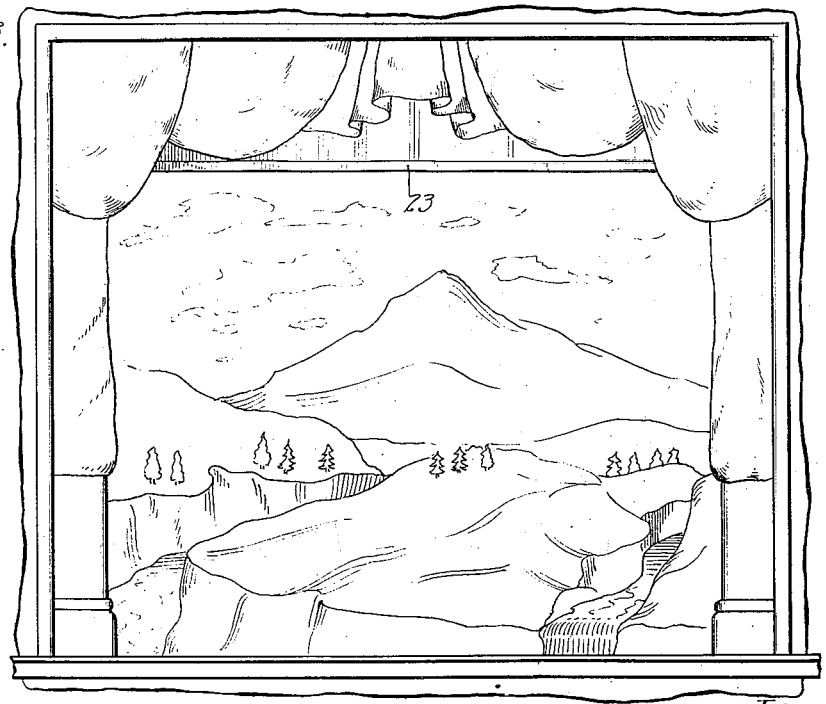

Patented June 5, 1923.

1,457,782

UNITED STATES PATENT OFFICE.

FRANK J. McGETTIGAN, OF PORTLAND, OREGON.

PICTURE-PROJECTOR ATTACHMENT.

Application filed March 25, 1921. Serial No. 455,624.

*To all whom it may concern:*

Be it known that I, FRANK J. McGETTIGAN, a citizen of the United States, residing at Portland, in the county of Multnomah and State of Oregon, have invented certain new and useful Improvements in Picture-Projector Attachments, of which the following is a specification.

My invention has reference to a device for interrupting or preventing projection of more or less of a picture on a screen, and is particularly adapted to gradually expose the picture on the screen or to eliminate a portion of the picture and provide a blank space in the projected picture for the display of other pictures.

In picture theatres it is customary to have a curtain in front of the screen, which is withdrawn to expose the screen when pictures are to be shown. It is undesirable to expose the bare screen, and to avoid it many operators throw the picture on before the curtain is raised, even though this is unsatisfactory as the picture appears confused on the curtain and is distorted by the raising thereof. With my invention I provide a shield or shutter in the path of the light rays and gradually withdraw same as the curtain is raised so that the picture appears only on the screen as it is gradually exposed and this gives the impression that the rising curtain is uncovering the picture. Likewise, when the curtain is to be lowered, the shield is operated in the reverse manner to cut off the picture so that it will appear as if the curtain was covering the picture.

Furthermore, the projected pictures when properly focused, sometimes do not cover the entire screen, and leave a blank border which it is desirable to fill in, or in some cases a picture may be more strikingly displayed by showing it in an appropriate setting. With my invention a picture may be projected on the screen with a space in the center, or any other part of the screen, blanked out so that another picture may be shown therein, thus affording a setting for the latter picture, or a border to fill out the screen.

The principal objects of my invention are to gradually expose the picture on the screen as the curtain is raised, so as to produce the effect that the rising curtain uncovers the picture, and reversely, to gradually cut off the picture as the curtain is lowered; to blank out a portion of a projected picture so that another picture may be shown therein; to enable a picture to be displayed in an appropriate border or setting which is projected on the screen; to provide devices on the frame of the picture projecting machine for accomplishing the above indicated objects, and, in general, to provide facilities for displaying pictures in a more satisfactory and pleasing manner than heretofore.

On the drawings—

Fig. 1 is a front view of a supporting frame for lantern slides, having my improvements applied thereto;

Fig. 2 is a sectional view on the line 2—2 of Fig. 1;

Fig. 3 is a sectional view on the line 3—3 of Fig. 1;

Fig. 4 is a side view of my improved slide carrier set up for use.

Fig. 5 is a diagrammatic view showing the manner of using my device to show a picture in the blanked out space of another picture;

Fig. 6 is a front view of the stage and screen showing pictures projected in accordance with the diagram of Fig. 5;

Fig. 7 is a similar view showing the manner of gradually exposing the projected picture as the curtain is raised; and Fig. 8 is a similar view showing the complete exposure of the picture when the curtain is entirely raised.

Referring to the drawings, the reference numeral 1 indicates the front of a lantern of the usual type for lantern slides, which has a pair of condensers 2, through which the light rays from the lantern are convergently directed through the slide. A pair of supporting rods 3 are secured to and extended forwardly from the machine 1 and have the frame or carrier 4 slidably mounted thereon and provided with set screws 5, so as to be capable of adjustment toward and away from the lantern. The carrier 4 is constructed in the usual manner with an opening or window 6 through which the picture is projected, and has horizontal flanges 7 and 8 at the top and bottom respectively thereof between which the slide holder 9 is mounted. The slide holder may be of any suitable type and mounted in the carrier 4 in any desired manner, the one shown comprising a frame which is clamped in the carrier by set screws 10 on the top flange 7 which engage against the top of the slide holder and hold a tongue on the lower edge of the holder in a groove in the upper face of the flange 8. The frame or holder 9 has an opening 11 which registers with the opening or window 6 of the carrier 4, and has upper and lower flanges between which the slide 12 engages and is held by light springs 13 which loosely bear against the back of the slide 12 for holding the latter in place, and permitting sliding movement thereof endwise along the slide holder 9. To limit the insertion of the slide 12, the frame 9 has a screw 14 at one end against which the end of the slide 12 engages when fully inserted. The structure just described is merely shown to illustrate the application of my invention to a slide holder, but it is to be understood that it may be used with other forms of slide holders and also with moving picture projectors in which slide holders are not employed.

Mounted at the front of the frame 4 are a pair of opposed vertical guides 15 between which a plate 16 slides so as to close the opening 6 through which the picture is projected, and a lever 17 is pivoted to the frame 4 at 18, and has the inner end engaged in a slot 19 of the plate 16, and the outer end provided with a handle 20 whereby the lever may be manipulated for the purpose of withdrawing the plate 16 downwardly from the closed position shown in Fig. 1, so as to uncover the opening 6. The plate 16 is preferably provided with an extension 21 at each side which slides in the guides 15 when the plate is moved downwardly, and these extensions have outturned portions 22 at their upper ends which engage the upper ends of the guides 15 when the plate is fully withdrawn, and thus limit the opening movement of the plate 16.

This plate 16 is intended to be operated so as to gradually uncover the opening 6 as the curtain, in front of the screen upon which the picture is displayed, is raised, so that the exposure of the picture corresponds with and follows the exposure of the screen, and produces the effect of the rising curtain uncovering the picture, and said plate is arranged to open downwardly inasmuch as the rays from the lantern converge to a focal point beyond the lantern slide, and the latter must, therefore, be placed in the frame 4 in an upside down position to provide the proper view on the screen. The bottom of the picture is, therefore, at the top of the opening 6, and as the plate 16 moves downwardly it gradually uncovers the slide 12, so that the initial exposure is at the bottom of the screen.

In Fig. 7 a picture is shown as it is being uncovered by the raising of the curtain 23, the plate 16 being operated so that the line at which the view is cut off coincides with the lower edge of the curtain, and Fig. 8 shows the curtain fully raised, and the view, a part of which is shown in Fig. 7, fully exposed.

For the purpose of blocking out a portion of the slide 12 when the latter is projected on the screen, a plate 24 of suitable size to afford a blank space of the desired size and form on the screen is arranged so that it may be turned down to a position adjacent the slide 12, as shown by full lines in Fig. 3 and also by dotted lines in Fig. 1. This plate is carried by a thin arm 25 which is fixed to a rod 26, pivoted along the edge of the top flange 7, and the rod has one end bent as indicated at 27 in Fig. 1, so that the rod 26 may be readily rotated in its bearings to swing the plate 24 to and from the position adjacent to the plate or slide 12.

When this plate 24 is used the rays of light from the lantern 1, as shown by the diagram in Fig. 5, are obstructed so that the intermediate portion of the screen indicated at 28 is dark, thus forming a space as indicated in Fig. 6 surrounded by a border view indicated at 33 which fills the entire screen with the exception of the central blanked out space 28. A moving picture projecting machine 29 may be placed adjacent the lantern 1, as shown in Figure 5 and adjusted so that the picture projected thereby from the film occupies the space 28 on the screen, as shown in Fig. 6. It is to be understood that the space blanked out may be of any desired form, as this merely requires constructing the plate 24 accordingly, and furthermore two or more small plates may be used instead of the one, so as to provide a number of blanks in the picture which is projected on the screen.

In the event that curtains, draperies or the like, form an irregular outline for the screen, a mat may be employed in the opening 11 of the frame 9, or the opening 6 of the frame 4, so that the outline of the projected view corresponds with the outline of the screen, as shown in Figs. 6, 7 and 8, or the screen may cover the entire stage, if desired, and the decorative features, such as curtains, pillars or scenery furnished by using a slide with these features, preferably in colors bordering a blank space in which other pictures are projected.

Inasmuch as the plate or slide 12 may be maintained in position before the lantern 1 for a considerable length of time a water tank 29 may be interposed between the lantern 1 and the frame 4, and provided with windows 30 through which the rays are to be transmitted, this water tank serving to absorb the heat from the projected rays, and prevent transmission of same to the plate or slide 12. Water is slowly circulated through the receptacle 29 by means of an inlet connection 31, and an outlet connection 34, so that the water as it absorbs the heat rises and discharges through the outlet 34.

As indicated hereinbefore, my invention may be used in connection with moving picture projectors as well as with machines like that in connection with which it is shown and described, and I therefore use the term "transparent picture" in the claims to include moving picture films as well as lantern slides.

While I have shown and described my invention in a preferred form, I am aware that various changes and modifications may be made without departing from the principles of my invention, the scope of which is to be determined by the appended claims.

I claim as my invention:

1. The combination of a picture projector, a screen, a curtain in front of the screen, a support for holding a transparent picture in the path of the rays so as to reproduce the picture on the screen, and means adjustable across the path of the rays from the projector so as to regulate the display of the picture to correspond with the amount of the screen which is exposed as the curtain is withdrawn from the front of the screen.

2. The combination with a picture projector, of a screen having a curtain adapted to be raised for exposing the screen, and means adjacent the projector and movable in the path of the projected rays so as to gradually expose the picture on the screen as the latter is gradually uncovered by the curtain.

3. The combination with a picture projecting machine of means for holding a transparent picture in the path of the light rays from the projecting machine, a slide on said means movable transversely across the path of the light rays, and a shield pivoted on said means and movable to a position adjacent and at the center of the transparent picture.

4. The method of displaying pictures which comprises mounting a transparent picture in position to be projected on a curtained screen, interposing a plate in the path of the projected rays and gradually withdrawing the plate as the curtain is raised, so that the raising of the curtain appears to uncover the picture on the screen.

FRANK J. McGETTIGAN.